US006907855B2

(12) United States Patent
Mueller

(10) Patent No.: US 6,907,855 B2
(45) Date of Patent: Jun. 21, 2005

(54) GEROTER TYPE INTERNAL COMBUSTION ENGINE

(75) Inventor: Matthew James Mueller, Wauwatosa, WI (US)

(73) Assignee: Harley-Davidson Motor Company Group, Inc., Milwaukee, WI (US)

( * ) Notice: Subject to any disclaimer, the term of this patent is extended or adjusted under 35 U.S.C. 154(b) by 0 days.

(21) Appl. No.: 10/690,338

(22) Filed: Oct. 21, 2003

(65) Prior Publication Data

US 2005/0081818 A1   Apr. 21, 2005

(51) Int. Cl.$^7$ ............................. F02B 53/00; F01C 1/00
(52) U.S. Cl. ...................... 123/246; 123/204; 418/165; 418/170
(58) Field of Search ................................ 123/246, 237, 123/235, 236, 204; 418/170, 165, 171

(56) References Cited

U.S. PATENT DOCUMENTS

| 3,307,525 A | | 3/1967 | McClure |
| 3,548,789 A | * | 12/1970 | Creek .......................... 123/235 |
| 3,850,150 A | * | 11/1974 | Plevyak ....................... 123/246 |
| 3,883,276 A | | 5/1975 | Hofbaüer |
| 4,424,013 A | | 1/1984 | Bauman |
| 4,480,971 A | | 11/1984 | Swedberg |
| 5,195,882 A | * | 3/1993 | Freeman ..................... 418/171 |
| 5,720,251 A | * | 2/1998 | Round et al. ............... 123/246 |
| 2002/0157636 A1 | * | 10/2002 | Klassen ....................... 123/246 |

FOREIGN PATENT DOCUMENTS

| DE | 4023299 A1 | * | 2/1991 | ................. 123/204 |
| EP | 85427 A1 | * | 8/1983 | ................. 123/237 |
| FR | 2574868 A1 | * | 6/1986 | ................. 418/165 |
| JP | 58206827 A | * | 12/1983 | ................. 123/237 |

* cited by examiner

Primary Examiner—Thai-Ba Trieu
(74) Attorney, Agent, or Firm—Michael Best & Friedrich, LLP

(57) ABSTRACT

An internal combustion engine including a housing, an intake port defined in the housing, an exhaust port defined in the housing, and a generally cylindrical combustion chamber defined in the housing. The combustion chamber communicates with the intake port and the exhaust port and a combustion geroter is received by and rotatable within the combustion chamber. During operation, the combustion geroter receives a fuel mixture, compresses the fuel mixture, combusts the fuel mixture, and discharges the combusted fuel mixture to the exhaust port.

20 Claims, 2 Drawing Sheets

GEROTER TYPE INTERNAL COMBUSTION ENGINE

FIELD OF THE INVENTION

The invention relates to internal combustion engines, and more particularly to two-cycle rotary internal combustion engines.

BACKGROUND

Many types and configurations of internal combustion engines are well known in the art. Many modern internal combustion engines operate on either a two-cycle operating sequence, or a four-cycle operating sequence. Some internal combustion engines are of the reciprocating piston type and include one or more pistons coupled to a crankshaft for reciprocation within an engine cylinder. Other internal combustion engines are of the rotary or "Wankel" type, and include a rotating piston element. Different combinations of engine operating cycles and engine configurations have been developed and utilized for a variety of applications.

SUMMARY OF THE INVENTION

The present invention provides an internal combustion engine including a housing, an intake port defined in the housing, an exhaust port defined in the housing, and a generally cylindrical combustion chamber defined in the housing. The combustion chamber communicates with the intake port and the exhaust port. The engine also includes a combustion geroter received by and rotatable within the combustion chamber. During operation, the combustion geroter receives a fuel mixture, compresses the fuel mixture, combusts the fuel mixture, and discharges the combusted fuel mixture to the exhaust port.

The internal combustion engine can also include a generally cylindrical compression chamber that is also defined in the geroter housing and communicates with the intake port. An intermediate manifold can be formed in the housing for communication between the compression chamber and the combustion chamber. A compressor geroter can be received by and rotatable within the compression chamber. During operation, the compressor geroter receives the fuel mixture from the intake port, compresses the fuel mixture, and discharges the compressed fuel mixture to the intermediate manifold. The engine can also include a drive shaft coupling the compressor geroter and the combustion geroter for rotation together. The engine is configured such that the combustion geroter receives the compressed fuel mixture from the intermediate manifold.

The present invention also provides a method for rotatably driving a drive shaft. The method includes providing a geroter having an inner gear coupled to the drive shaft and an outer gear engaging the inner gear. A fuel mixture is delivered to the geroter, compressed in the geroter, combusted in the geroter, expanded in the geroter, thereby drivingly rotating the geroter and the drive shaft, and discharged from the geroter.

Other features of the invention will become apparent to those skilled in the art upon review of the following detailed description, claims, and drawings.

Figure 1:
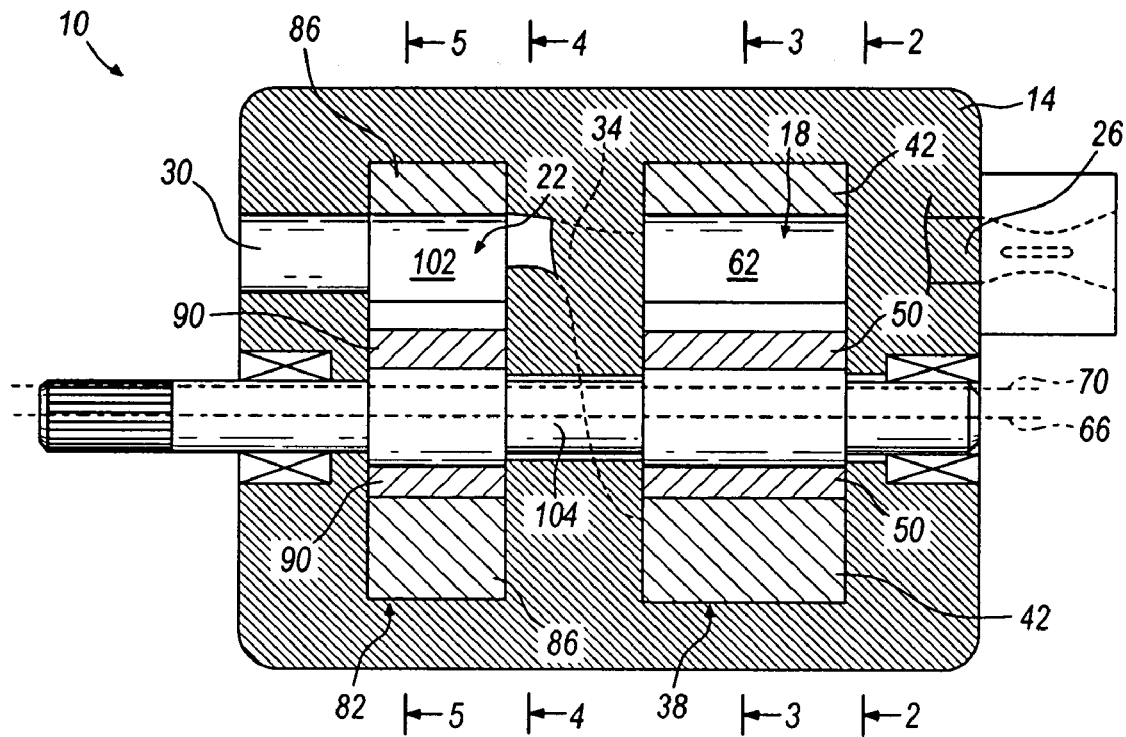
FIG. 1 is a section view of a two-cycle geroter engine embodying the invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION

FIG. 1 illustrates a two-cycle geroter internal combustion engine 10 of the present invention. The engine 10 includes an engine geroter housing 14 that defines a compression chamber 18 and a combustion chamber 22. The housing 14 also defines an intake port 26 that communicates with the compression chamber 18, and an exhaust port 30 that communicates with the combustion chamber 22. An intermediate manifold 34 is also defined by the housing 14 and communicates between the compression chamber 18 and the combustion chamber 22.

Figure 2:
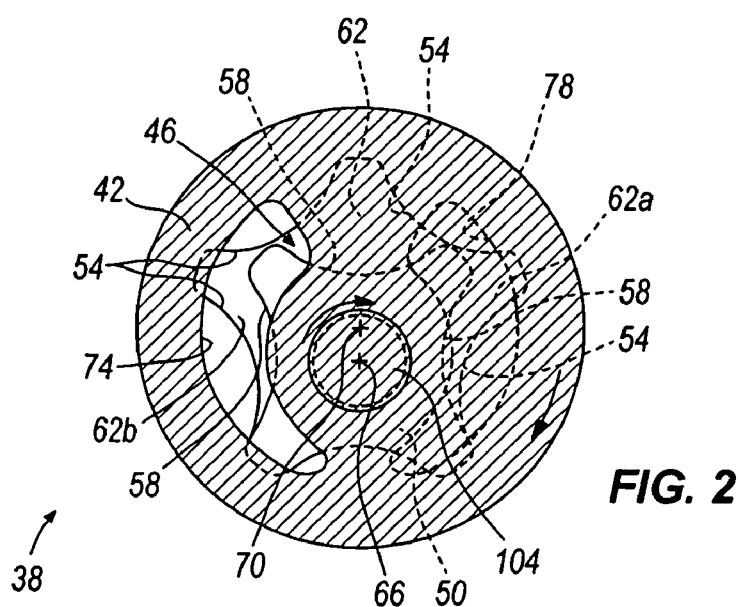
FIG. 2 is a section view taken along line 2—2 of FIG. 1.
Figure 3:
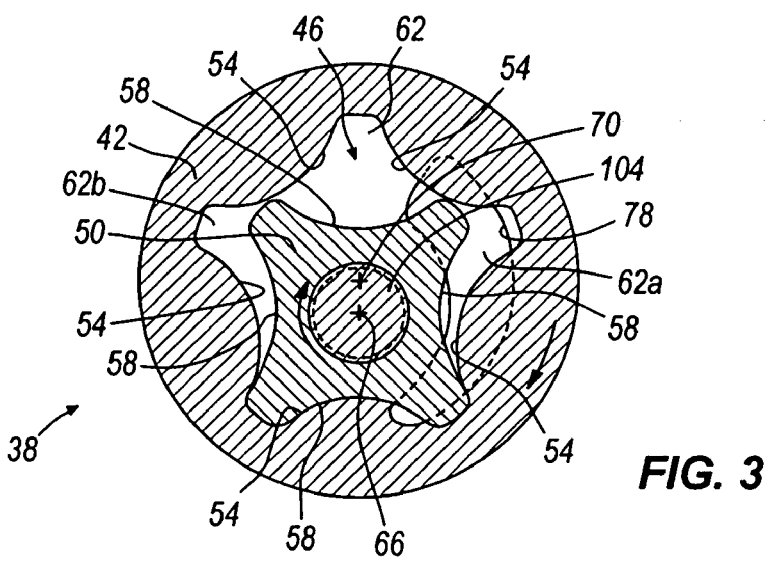
FIG. 3 is a section view taken along line 3—3 of FIG. 1.

Referring also to FIGS. 2 and 3, an upstream compressor geroter 38 is rotatably received by the geroter housing 14 within the compression chamber 18. The compressor geroter 38 includes an outer gear 42 that defines a geroter chamber 46, and an inner gear 50 that is received by the geroter chamber 46. As illustrated, the geroter chamber 46 is generally star shaped and includes five convex surfaces 54. The inner gear 50 includes four concave surfaces 58 that cooperate with the convex surfaces 54 to define four charge chambers 62.

During engine operation, the inner gear 50 rotates about a first axis 66, and the outer gear 42 rotates about a second axis 70 that is spaced from and is substantially parallel to the first axis 66. The surfaces of the inner and outer gears 50, 42 slidingly and rollingly engage each other as the gears 50, 42 rotate with respect to the geroter housing 14 such that the charge chambers 62 increase and decrease in volume while orbiting the first and second axes 66, 70. Specifically, for each rotation of the inner gear 50, an individual charge chamber 62 decreases from a maximum volume (illustrated in the 12 o'clock position in FIGS. 2 and 3) to a minimum volume (illustrated in the 6 o'clock position in FIGS. 2 and 3), and then increases back to the maximum volume. Thus, for clockwise rotation of the inner and outer gears 50, 42 of FIGS. 2 and 3, the charge chamber 62a in the 3 o'clock position is decreasing in volume, and the charge chamber 62b in the 9 o'clock position is increasing in volume. Because the inner gear 50 includes four concave surfaces 58 and the outer gear 42 includes five convex surfaces 54, the inner gear 50 rotates faster than the outer gear 42 during engine operation.

It should be appreciated that the inner and outer gears 50, 42 could be alternatively configured to include a different number of concave and convex surfaces. Generally, the outer gear 42 will include N convex surfaces, and the inner gear 50 will include N-1 concave surfaces. However, the configuration of the gears could be altered such that the outer gear 42 includes N concave surfaces and the inner gear 50 includes N-1 convex surfaces. The specific number of convex/concave surfaces and the resultant number of charge chambers are determined by the specific application for which the engine is to be utilized. The various geroter modifications and variations described above are presumed to be well known in the art, and therefore provide a number of foreseeable equivalent geroter configurations that will function and operate in substantially the same way as the embodiments described in further detail herein.

The intake port 26 includes an intake aperture 74 that opens into the compression chamber 18 (see FIG. 2). The intake aperture 74 may be kidney-shaped and is positioned to communicate with the charge chambers 62 when the charge chambers 62 are increasing in volume. Similarly, the intermediate manifold 34 includes an outlet aperture 78 that also opens into the compression chamber 18 (see FIG. 3). Unlike the intake aperture 74, the outlet aperture 78 is positioned to communicate with the charge chambers 62 when the charge chambers 62 are decreasing in volume. This arrangement generally results in the intake aperture 74 being positioned on one side of a plane that extends through the first and second axes 66, 70, and the outlet aperture 78 being positioned on an opposite side of the plane extending through the first and second axes 66, 70. Like the intake aperture 74, the outlet aperture 78 may be kidney-shaped.

During engine operation, as an individual charge chamber 62 increases in volume, a pressure differential is created that draws a charge of fuel mixture (or at least a portion of a charge of fuel mixture) from the intake port 26 into the charge chamber 62. Communication between the charge chamber 62 and the intake port 26 is cut-off as the charge chamber 62 reaches a position generally associated with the charge chamber 62 reaching a maximum volume (e.g. near the 12 o'clock position in FIGS. 2 and 3). At substantially the same or at a slightly advanced position, the charge chamber 62 begins to decrease in volume and moves into communication with the outlet aperture 78. The charge of fuel mixture is therefore discharged through the outlet aperture 78 and into the intermediate manifold 34. As the charge chamber 62 continues decreasing in volume, the charge is compressed within the intermediate manifold 34 to an elevated pressure. As the charge chamber 62 reaches and moves past a position generally associated with a minimum volume, communication with the outlet aperture 78 is cutoff, and communication with the intake aperture 74 is reestablished. Another charge of fuel mixture is then drawn into the charge chamber 62 and subsequently compressed and discharged into the intermediate manifold 34.

Figure 4:
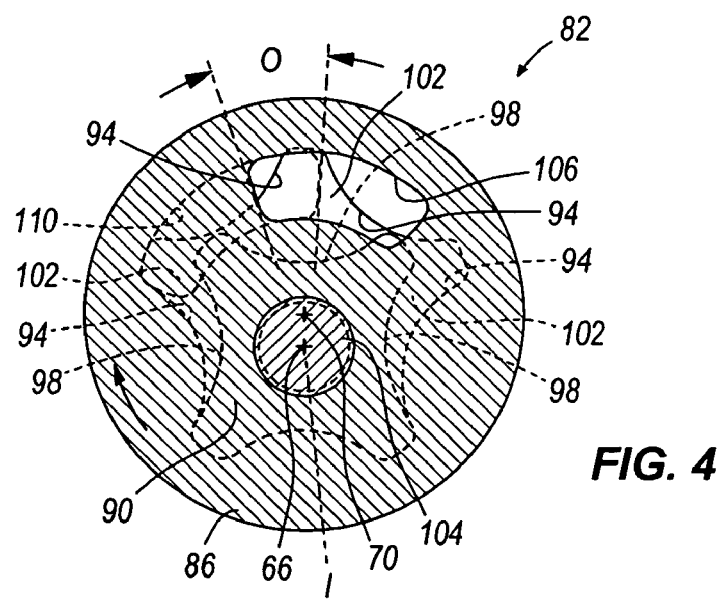
FIG. 4 is a section view taken along line 4—4 of FIG. 1.
Figure 5:
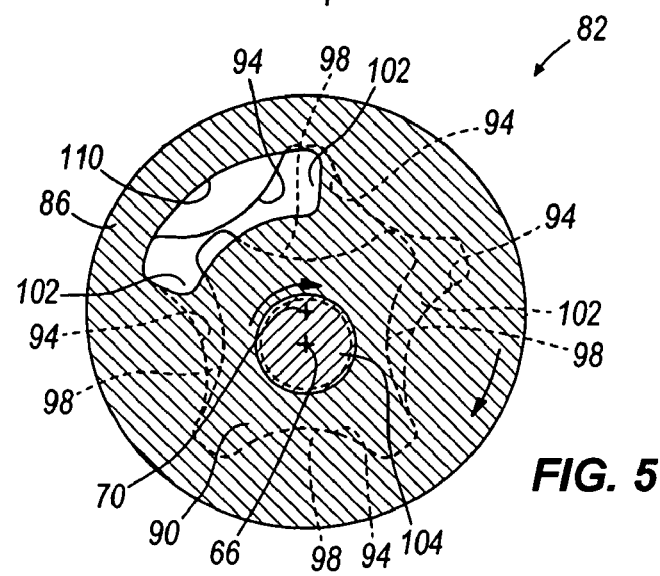
FIG. 5 is a section view taken along line 5—5 of FIG. 1.

Referring also to FIGS. 4 and 5, a combustion geroter 82 is also rotatably received by the geroter housing 14 within the combustion chamber 22. The illustrated combustion geroter 82 is configured similarly to the compressor geroter 38 and includes an outer gear 86 and an inner gear 90 that is received by the outer gear 86. The outer gear 86 includes five convex surfaces 94, and the inner gear 90 includes four concave surfaces 98 that cooperate with the convex surfaces 94 to define four ignition chambers 102 that are similar to the charge chambers 62. The inner gear 90 of the combustion geroter 82 is coupled to the inner gear 50 of the compressor geroter 38 by a drive shaft 104 for drivingly rotating the compressor geroter 38. In the illustrated embodiment, the drive shaft 104 and the inner gear 90 rotate about the first axis 66, and the outer gear 86 rotates about the second axis 70. However, the engine is not limited to this configuration, as will be discussed further below.

The surfaces of the inner and outer gears 90, 86 slidingly and rollingly engage each other as the gears 90, 86 rotate such that the ignition chambers 102 increase and decrease in volume while orbiting the first and second axes 66, 70. For clockwise rotation of the combustion geroter 82 of FIGS. 4 and 5, ignition chambers 102 to the right of the first and second axes 66, 70 are decreasing in volume, and ignition chambers 102 to the left of the first and second axes 66, 70 are increasing in volume. Operation of the combustion geroter 82 is in many ways analagous to the operation of the compressor geroter. It should therefore be appreciated that the variations and alternative configurations discussed above with respect to the compressor geroter 38 also apply to the combustion geroter 82.

The intermediate manifold 34 communicates with the combustion chamber 22 through a charge inlet aperture 106. With respect to FIG. 4, the inlet aperture 106 may be kidney-shaped and is positioned to communicate with the ignition chambers 102 from a point just before the ignition chambers 102 reach maximum volume (e.g. the 12 o'clock position in FIG. 4) until the ignition chambers 102 have decreased in volume to an intermediate volume (e.g. approximately the 2 o'clock position in FIG. 4). The exhaust port 30 communicates with the combustion chamber 22 through an exhaust aperture 110. The exhaust aperture 110 may be kidney-shaped and is positioned to communicate with the ignition chambers 102 from a point where the ignition chambers 102 are increasing in volume (e.g. approximately the 9:30 position in FIGS. 4 and 5), until the ignition chambers 102 reach maximum volume. As illustrated, there is a period during ignition chamber movement wherein the exhaust aperture 110 and the inlet aperture 106 are in simultaneous communication with the ignition chamber 102. This period is known as the "overlap" and is a feature that is common among two-cycle internal combustion engines, regardless of the type of engine configuration (e.g. reciprocating piston or rotary) that is employed. The overlap area is indicated by the reference character "O" in FIG. 4.

The relative positioning of the inlet aperture 106 and the exhaust aperture 110 provides an appropriate arrangement for operation of the combustion geroter 82 as a two-cycle internal combustion engine. As an individual ignition chamber 102 approaches a position associated with a maximum volume, communication between the ignition chamber 102 and the intermediate manifold 34 is established. The charge of fuel mixture that was previously compressed into the intermediate manifold 34 by the compressor geroter 38 begins to flow into the ignition chamber 102. As with conventional two-cycle engines, fluid momentum of the fuel mixture and backpressure in the exhaust port 30 allow the charge of fuel mixture to enter the ignition chamber 102 even as the ignition chamber is decreasing in volume. As the combustion geroter 82 continues to rotate, the ignition chamber 102 moves to a position wherein communication with the intermediate manifold 34 is cut off, and the pre-compressed fuel mixture is further compressed in preparation for ignition of the fuel mixture.

In the illustrated embodiment, ignition of the fuel mixture occurs before the ignition chamber 102 reaches minimum volume, approximately at the position indicated by the reference character "I" in FIG. 4. Of course the exact moment at which ignition of the fuel mixture occurs can vary (even during engine operation) and is largely determined by engine size, fuel type, operating speed, and other parameters, as will be readily apparent to those of ordinary skill in the art. The internal combustion engine 10 of the present invention can be adapted for use as a spark-ignition engine, and as a compression-ignition engine (e.g. a diesel engine). For use as a spark-ignition engine, a spark plug hole (not shown) is provided in the geroter housing 14 and a spark plug is inserted therein such that a spark plug electrode is appropriately positioned in the combustion chamber to ignite the fuel mixture. Voltage can be provided to the spark plug in a known manner using ignition coils and the like. The firing of the spark plug can also be timed in a known manner using known devices such as distributors or electronic control modules, for example. For use as a compression-ignition engine, the relative sizes of the geroters 38, 82, the inner gears 50, 90 and the outer gears 42, 86 are selected such that, when using diesel fuel, the pressure increase (and resultant temperature increase) during the final charge compression in the combustion geroter 82 is sufficient to ignite the fuel mixture when the ignition chamber 102 is in the appropriate position.

After the charge has been ignited, the charge and the ignition chamber 102 begin to expand. The expanding charge urges the concave surface 98 of the inner gear 90 away from the convex surface 94 of the outer gear 86, which in turn drivingly rotates the combustion geroter 82 (and also the compressor geroter 38 by way of the drive shaft 104) in a clockwise direction as illustrated in FIGS. 2–5. As the ignition chamber 102 expands and moves toward the 12 o'clock position, communication is established with the exhaust aperture 110. The expanding fuel charge begins to flow out of the ignition chamber 102, through the exhaust aperture 110, and into the exhaust port 30. When the ignition chamber 102 reaches maximum volume, communication has also been established with the inlet aperture 106 due to the overlap area O discussed above. If the operating conditions are appropriate, the momentum of the combusted fuel charge that is exiting the ignition chamber 102 creates a slight vacuum in the ignition chamber 102, which can assist in drawing a fresh charge of fuel mixture into the ignition chamber 102 through the inlet aperture 106. Upon further rotation of the combustion geroter 82, communication between the ignition chamber 102 and the exhaust aperture 110 is cutoff, and the combustion cycle is repeated using the fresh charge of fuel mixture.

As thus far described, the engine 10, including the combustion geroter 82 which drivingly rotates the compressor geroter 38 by way of the drive shaft 104, can be reasonably categorized as a supercharged two-cycle engine. With specific reference to FIG. 1, the compressor geroter 38 has a greater length in the axial direction than the combustion geroter 82. As a result, the maximum volume of an individual charge chamber 62 is greater than the maximum volume of an individual ignition chamber 102. The relative volumes of the charge chambers 62 and the ignition chambers 102 can be selected to establish the amount of fuel mixture pre-compression or "boost" provided by the compressor geroter 38. While the illustrated engine 10 accomplishes this by providing a compressor geroter 38 of greater axial length than the combustion geroter 22, similar results could be achieved by increasing the diameter of the compressor geroter 38 with respect to the combustion geroter 22.

As discussed above and illustrated in the Figures, the inner gears 50, 90 of both the compressor geroter 38 and the combustion geroter 82 include four concave surfaces 58, 98 each. Thus, for one complete revolution of the engine 10, there are four combustion events, one combustion event occurring in each ignition chamber 102 per inner gear revolution. Also, by comparing FIGS. 3 and 4, it can be seen that the charge of fuel mixture that is expelled from the charge chamber 62 in the 3 o'clock position is being communicated to the ignition chamber 102 that is in the 12 o'clock position via the intermediate manifold 34.

It should be appreciated that the invention is not limited to these specific configurations. For example, the illustrated geroters 38, 82 can be considered to be "in phase" because the positions corresponding to the maximum volumes of the charge chambers 62 and the ignition chambers 102 (e.g. the 12 o'clock positions) are substantially radially aligned. It should be appreciated that the geroters 38, 82 can be shifted to different radial positions with respect to each other. Such shifting would generally result in a reconfiguration of the intermediate manifold 34, which might extend through the geroter housing 14 in a different manner than that illustrated in the Figures. Also, the compressor geroter 38 and the combustion geroter 82 need not necessarily have the same number of charge chambers 62 and ignition chambers 102. Either geroter 38, 82 can be configured to provide with more or fewer chambers 62, 102 depending upon the specific application and desired power characteristics of the engine 10.

In addition to being radially aligned, in the illustrated embodiment, the combustion geroter 82 is also substantially axially aligned with the compressor geroter 38. Specifically, the inner gears 50, 90 both rotate about the first axis 66, and the outer gears 42, 86 both rotate about the second axis 70. It should be understood that the present invention is not limited with respect to the arrangement and alignment of the compressor geroter 38 and the combustion geroter 82. For example, the geroters 38, 82 can be positioned to lie in substantially the same plane (e.g. the plane defined by section line 3—3 in FIG. 1) and the inner gears 50, 90 can be drivingly coupled to each other using differently configured drive shafts that can include belts, pulleys, gears, chains, and substantially any other type of coupling. Additional configurations that position the geroters 38, 82 at angles with respect to each other are also foreseeable. In this regard, an arrangement of bevel gears could be employed to drivingly couple the geroters 38, 82 to each other. Of course, each variation on the positioning of the geroters 38, 82 will result in a reconfiguration of the intermediate manifold 34 and the apertures 74, 78, 102, 106 such that appropriate fluid communication is maintained between the compressor chamber 18 and the combustion chamber 22. In short, the arrangement, alignment, and orientation of the geroters 38, 82 are not limited to the configurations illustrated in the Figures.

With respect to the various apertures (e.g. the intake aperture 74, outlet aperture 78, inlet aperture 106, and exhaust aperture 110), the positioning and alignment of the apertures with respect to the geroters are illustrated and described above as examples only. The descriptions of the apertures that include references to clock positions are mere approximations of possible aperture configurations. As will be well appreciated by those of skill in the engine arts, the arrangement and alignment of the various ports, valves and passageways forming the fuel mixture flow path of substantially any internal combustion engine is largely a function of the intended use and operating characteristics of the engine. As such, significantly different variations of the aperture arrangements presented above are possible without departing from the spirit and scope of the present invention. One characteristic of the apertures that may be subject to significant design variations is the overlap area O. Increasing or decreasing the amount of overlap, as well as shifting the period of overlap with respect to the rotation of the geroter are modifications that are both foreseeable and appropriate when designing an engine for a specific application.

It should also be appreciated that a variety of peripheral components can be utilized in combination with the engine 10. For example, the fuel mixture can be supplied by a carburetor (illustrated schematically in FIG. 1) that is positioned to deliver a mixture of fuel and air to the intake port 26. An electronic fuel injection system can be provided in place of the carburetor if such an arrangement is desired. The fuel injection system can be configured for port injection, wherein the fuel injectors inject fuel into the intake port 26, or can be configured for direct injection of fuel into the ignition chambers 102. Fuel injectors might also be positioned to inject fuel into the intermediate manifold 34 if so desired. In addition to the fuel mixture preparation devices described above, an exhaust system can be positioned for communication with the exhaust port 30. The exhaust system can be of substantially any design, and is generally provided to reduce engine noise and to regulate the resonance and pressure pulsations of the exhaust flow for improved engine performance.

Because the engine 10 is configured as a two-cycle engine, the fuel mixture can include a lubricating oil mist for engine lubrication. By mixing the lubricating oil with the charge of fuel mixture, the lubricating oil is brought into contact with the various geroter surfaces during engine operation. The lubricating oil can be mixed directly with the liquid fuel, or can be injected into the fuel mixture from a separate oil reservoir. Various lubrication passageways and channels can also be provided as an alternative to, or in combination with, the lubricating oil/fuel mixture. For example, a circumferential groove can be provided around the outer surfaces of the outer gears 42, 86 to lubricate the interface between the outer gears 42, 86 and the geroter housing 14. Various radially, axially, and circumferentially extending apertures and passageways can be provided in the housing 14, the inner and outer geroter gears 50, 90, 42, 86, and in the drive shaft 104 to deliver lubricating oil to various areas of the engine as required. Other lubrication methods and techniques are possible as well.

Various features of the invention are set forth in the following claims.

What is claimed is:

1. An internal combustion engine comprising:
   a housing;
   an intake port defined in the housing;
   an exhaust port defined in the housing;
   a generally cylindrical combustion chamber defined in the housing and communicating with the intake port and the exhaust port;
   a combustion geroter received by the combustion chamber and rotatable therein to receive a fuel mixture, compress the fuel mixture, combust the fuel mixture, and discharge the combusted fuel mixture to the exhaust port, the geroter including an outer gear and an inner gear, the inner gear including a shaft aperture and otherwise being substantially solid; and
   a spark plug positioned in the combustion chamber to combust the fuel mixture as the combustion geroter compresses the fuel mixture.

2. The internal combustion engine of claim 1, wherein the combustion geroter includes an inner gear and an outer gear that rotate within the combustion chamber, wherein the inner gear rotates about a first axis, and the outer gear rotates about a second axis that is spaced from and substantially parallel to the first axis.

3. The internal combustion engine of claim 2, wherein the inner and outer gears cooperate to define a plurality of ignition chambers that receive the fuel mixture, and wherein the ignition chambers increase and decrease in volume as the inner and outer gears rotate.

4. The internal combustion engine of claim 3, wherein the combustion chamber includes an aperture defined in the geroter housing and positioned to communicate with the ignition chambers when the ignition chambers are at a maximum volume and when the ignition chambers are decreasing in volume, and wherein the fuel mixture flows through the aperture and into the ignition chambers.

5. The internal combustion engine of claim 3, wherein the exhaust port includes an aperture that is positioned to communicate with the ignition chambers when the ignition chambers are increasing in volume.

6. An internal combustion engine comprising:
   a housing;
   an intake port defined in the housing;
   an exhaust port defined in the housing;
   a generally cylindrical combustion chamber defined in the housing and communicating with the intake port and the exhaust port; and
   a combustion geroter received by the combustion chamber and rotatable therein to receive a fuel mixture, compress the fuel mixture, combust the fuel mixture, and discharge the combusted fuel mixture to the exhaust port, the geroter including an outer gear and an inner gear, the inner gear including a shaft aperture and otherwise being substantially solid, wherein the fuel mixture is combusted due to a pressure increase that occurs as the fuel mixture is compressed by the combustion geroter.

7. An internal combustion engine comprising:
   a housing:
   an intake port defined in the housing;
   an exhaust port defined in the housing;
   a generally cylindrical combustion chamber defined in the housing and communicating with the intake port and the exhaust port;
   a combustion geroter received by the combustion chamber and rotatable therein to receive a fuel mixture, compress the fuel mixture, combust the fuel mixture, and discharge the combusted fuel mixture to the exhaust port, the geroter including an outer gear and an inner gear, the inner gear including a shaft aperture and otherwise being substantially solid;
   a generally cylindrical compression chamber defined in the geroter housing and communicating with the intake port;
   an intermediate manifold providing communication between the compression chamber and the combustion chamber;
   a compressor geroter received by the compression chamber and rotatable therein to receive the fuel mixture from the intake port, compress the fuel mixture, and discharge the compressed fuel mixture to the intermediate manifold; and
   a drive shaft coupling the compressor geroter and the combustion geroter for rotation together, wherein the combustion geroter receives the compressed fuel mixture from the intermediate manifold.

8. The internal combustion engine of claim 7, wherein the compressor geroter includes an inner gear and an outer gear that rotate within the compression chamber, wherein the inner gear rotates about a first axis, and the outer gear rotates about a second axis that is spaced from and substantially parallel to the first axis.

9. The internal combustion engine of claim 8, wherein the inner and outer gears cooperate to define a plurality of charge chambers that receive the fuel mixture, and wherein the charge chambers increase and decrease in volume as the inner and outer gears rotate.

10. The internal combustion engine of claim 9, wherein the intake port includes an aperture defined in the geroter housing and positioned to communicate with the charge chambers when the charge chambers are increasing in volume.

11. The internal combustion engine of claim 9, wherein the intermediate manifold includes an aperture defined in the geroter housing and positioned to communicate with the charge chambers when the charge chambers are decreasing in volume.

12. A method for rotatably driving a drive shaft comprising:
   providing a first geroter having an inner gear coupled to the drive shaft and an outer gear engaging the inner gear;
   providing a second geroter having a second inner gear coupled to the drive shaft and a second outer gear engaging the second inner gear;
   delivering a fuel mixture to the first geroter;
   compressing the fuel mixture in the first geroter;
   directing the fuel mixture from the first geroter to a second geroter via an intermediate manifold, the intermediate manifold completely defined by a stationary housing between the first geroter and the second geroter;
   combusting the compressed fuel mixture in the second geroter;
   expanding the combusted fuel mixture in the second geroter to drivingly rotate the second geroter and the drive shaft; and
   discharging the expanded fuel mixture from the second geroter.

13. The method of claim 12, further comprising:
   providing an upstream geroter having an inner gear coupled to the drive shaft and an outer gear engaging the inner gear;
   pre-compressing the fuel mixture in the first geroter; and
   communicating the pre-compressed fuel mixture from the first geroter to the second geroter.

14. The method of claim 13, wherein compressing the fuel mixture in the first geroter comprises further compressing the pre-compressed fuel mixture in the second geroter.

15. The method of claim 12, wherein providing a second geroter includes providing the second outer gear having N convex surfaces, and the second inner gear having N-1 concave surfaces, and wherein N-1 compressed fuel mixtures are combusted during each second inner gear rotation.

16. The method of claim 12, wherein combusting the compressed fuel mixture in the geroter comprises combusting the compressed fuel mixture in response to a pressure increase of the compressed fuel mixture.

17. An internal combustion engine comprising:
   a stationary housing;
   an intake port defined in the housing;
   an exhaust port defined in the housing;
   a first chamber defined in the housing;
   a second chamber defined in the housing;
   an intermediate manifold defined by the housing and extending from the first chamber to the second chamber;
   a first geroter disposed within the first chamber and operable to receive a flow of fluid from the intake port, compress the flow of fluid, and discharge a compressed flow of fluid to the intermediate manifold; and
   a second geroter disposed within the second chamber and operable to receive the compressed flow of fluid, combust the compressed flow of fluid, and discharge a flow of exhaust gas to the exhaust port.

18. The internal combustion engine of claim 17, wherein the first geroter includes an outer gear and an inner gear, the inner gear being substantially solid and supported for rotation by a shaft.

19. The internal combustion engine of claim 17, wherein the first geroter and the second geroter are substantially the same as one another.

20. An internal combustion engine comprising:
   a housing;
   an intake port defined in the housing;
   an exhaust port defined in the housing;
   a generally cylindrical combustion chamber defined in the housing and communicating with the intake port and the exhaust port;
   a combustion geroter received by the combustion chamber and rotatable therein to receive a fuel mixture, compress the fuel mixture, combust the fuel mixture, and discharge the combusted fuel mixture to the exhaust port;
   a generally cylindrical compression chamber defined in the geroter housing and communicating with the intake port;
   an intermediate manifold providing communication between the compression chamber and the combustion chamber;
   a compressor geroter received by the compression chamber and rotatable therein to receive the fuel mixture from the intake port, compress the fuel mixture, and discharge the compressed fuel mixture to the intermediate manifold; and
   a drive shaft coupling the compressor geroter and the combustion geroter for rotation together, wherein the combustion geroter receives the compressed fuel mixture from the intermediate manifold, wherein the compressor geroter includes an inner gear and an outer gear that rotate within the compression chamber, wherein the inner gear rotates about a first axis, and the outer gear rotates about a second axis that is spaced from and substantially parallel to the first axis, and wherein the inner and outer gears cooperate to define a plurality of charge chambers that receive the fuel mixture, and wherein the charge chambers increase and decrease in volume as the inner and outer gears rotate, and wherein the intake port includes an aperture defined in the geroter housing and positioned to communicate with the charge chambers when the charge chambers are increasing in volume.

* * * * *